United States Patent
Beach et al.

[19]

[11] Patent Number: 6,164,864
[45] Date of Patent: Dec. 26, 2000

[54] CYCLE SEAT CLAMP

[76] Inventors: Jimmie L. Beach, 138 S. East Ave., Oak Park, Ill. 60302; Robert Mizek, 1141 Valley View Dr., Downers Grove, Ill. 60516; Dale R. Paes, 532 N. Cuyler, Oak Park, Ill. 60302

[21] Appl. No.: 09/141,759

[22] Filed: Aug. 27, 1998

Related U.S. Application Data

[60] Provisional application No. 60/057,622, Sep. 4, 1997.

[51] Int. Cl.[7] .................................. B62J 1/10; F16B 2/14
[52] U.S. Cl. .................. 403/385; 403/409.1; 403/374.3; 297/207; 297/215.13; 297/215.15; 248/124.1
[58] Field of Search ................................. 403/409.1, 373, 403/374.1, 374.2, 374.3, 374.5, 385, 391, 389, 384, 59, 61; 297/195.1, 205, 215.13, 215.15, 207; 248/124.1, 125.1, 298.1

[56] References Cited

U.S. PATENT DOCUMENTS 575,631  1/1897  Brooks ............................. 297/215.15
4,312,611  1/1982  Herb ...................................... 411/9

FOREIGN PATENT DOCUMENTS 350888  1/1961  Switzerland ...................... 297/215.15

*Primary Examiner*—Lynne H. Browne
*Assistant Examiner*—Kenneth Thompson
*Attorney, Agent, or Firm*—Roth & Goldman

[57] ABSTRACT

A clamp assembly for adjustably attaching a bicycle or exercise device seat having seat support rails to a seat support post includes two spaced pairs of inner and outer cheekpieces which have parallel abutting surfaces inclined at an angle to the vertical, each of the cheekpiece pairs defining a seat rail receiving groove therebetween. Threaded fasteners attach the cheekpieces to each other and to a clamp support structure such that the cheekpieces slide relative to each other along a plane between the parallel abutting surfaces to open or close the grooves. The cheekpieces may also be pivotally mounted on the clamp support structure for simultaneous adjustment of the angle of inclination of the grooves and seat rails clamped therein merely by adjustment of the same threaded fasteners.

9 Claims, 8 Drawing Sheets

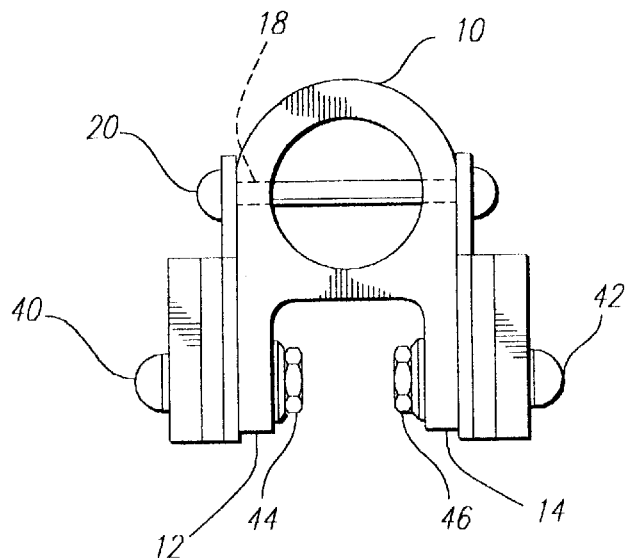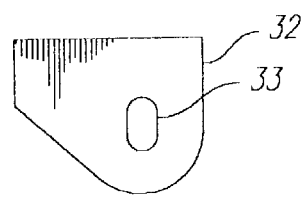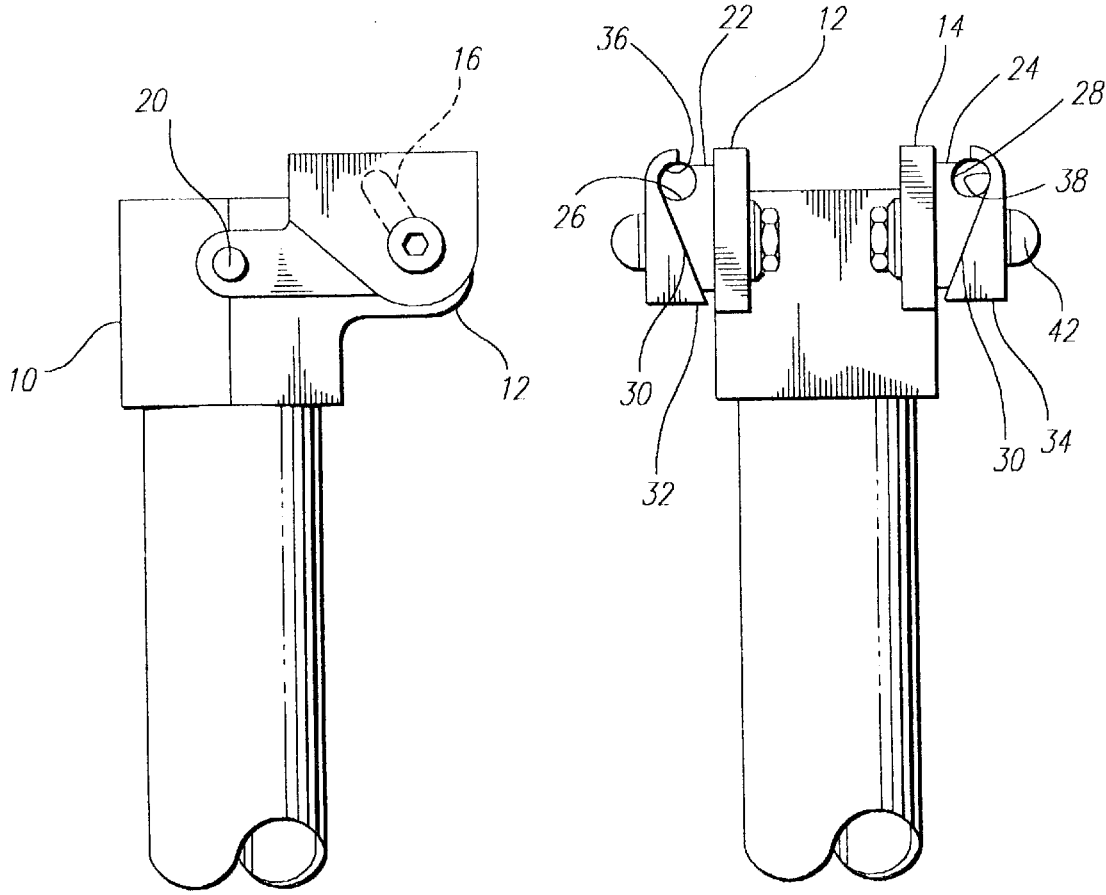

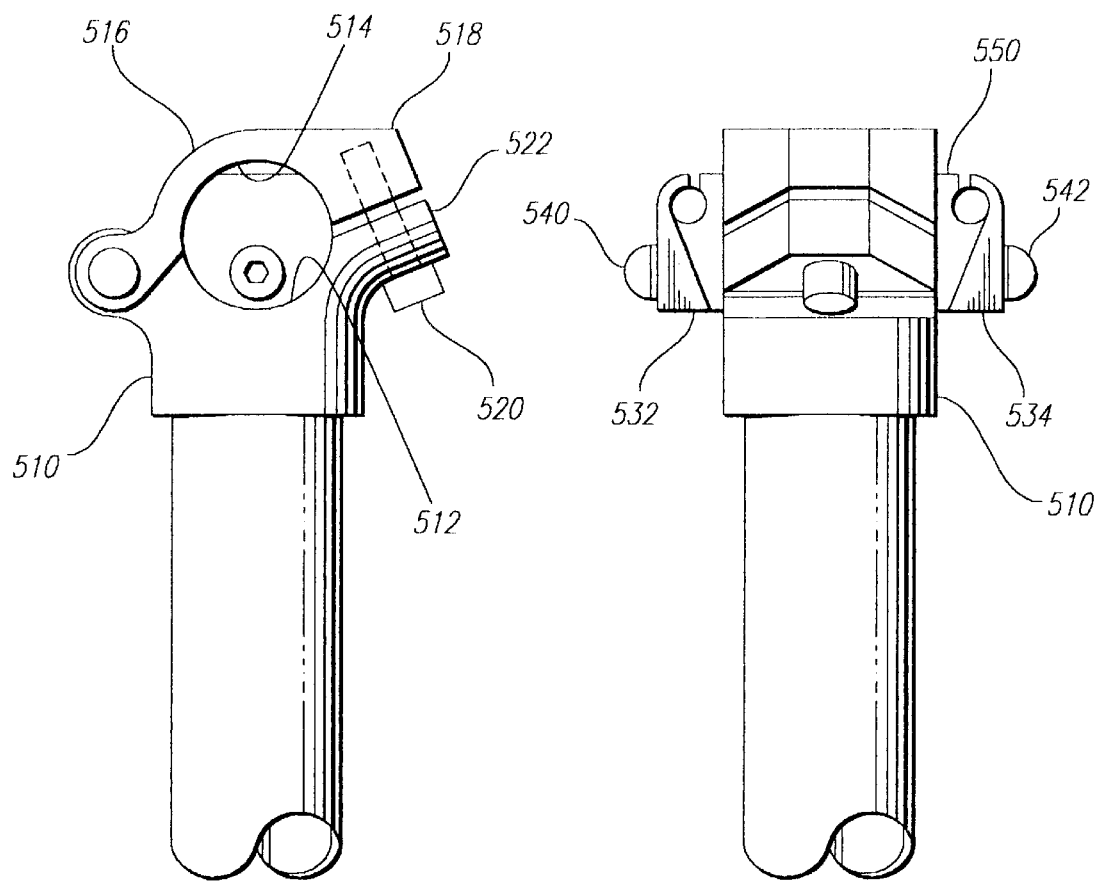

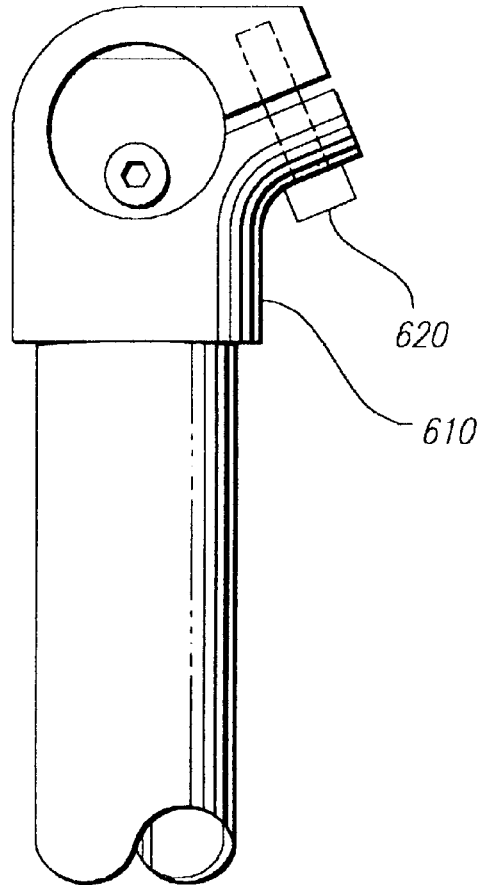
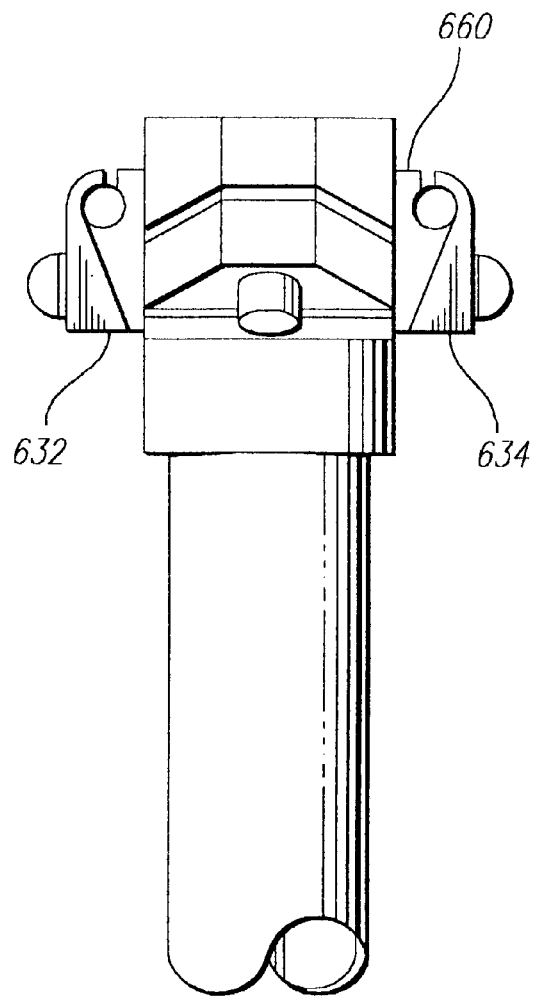
FIG. 17
FIG. 18

CYCLE SEAT CLAMP

CROSS REFERENCE TO RELATED APPLICATIONS, IF ANY

This application is a non-provisional application claiming the priority and incorporating by reference the teachings of provisional application Serial No. 60/057,622 filed Sept. 4, 1997.

BACKGROUND OF THE INVENTION AND PRIOR ART

The invention relates to an assembly for mounting a seat or saddle to a generally vertical mounting post of a bicycle or exercise device. Specifically, it relates to the clamping apparatus that mechanically joins the rails or wires that form the lower part of a seat frame to a seat post.

The invention is primarily designed for light weight cycles such as track, road and mountain bikes where minimization of weight and quick adjustability of the seat angle and/or offset of the seat from the seat post is important. For mountain biking, a rear offset of the seat from the centerline of the seat post is generally preferred in certain conditions to get more of the rider's weight over the rear wheel. Although adjustability of the offset and adjustability of the seat angle are important features of all bicycle seats, simultaneous adjustment of these parameters by simply loosening one set of fasteners is desired to both decrease weight and the time required to make adjustments.

As used herein, the terms left, right, front and rear refer to the sides of a bicycle or exercise cycle or similar type seat with which the present invention is used.

SUMMARY OF THE INVENTION

The presently preferred embodiment of the present invention provides a clamp assembly for adjustably attaching a seat having seat support rails to a seat support post, said clamp assembly comprising:

a) a clamp support structure having a portion configured for attachment to a seat support post, said structure having a pair of spaced generally parallel lugs thereon, said lugs each having a generally flat surface and an elongated slot therein;

b) first and second inner cheekpieces each pivotally attached to said structure, said elongated slots in said lugs extending generally in the direction of an arc centered on the pivotal connection of said inner cheekpieces to said structure, said inner cheekpieces each having an inner face surface abutting and slideably engageable with one of said generally flat surfaces of said lugs, an outer face surface angularly disposed with respect to said inner face surface, an aperture extending between said inner and outer face surfaces and a generally concave groove proximate an upper portion of said outer face surface;

c) first and second outer cheekpieces each having an outer face surface and an inner face surface, an aperture extending between said outer and inner face surfaces and a generally concave groove proximate an upper portion of said inner face surface, said inner face surfaces of said outer cheekpieces being slideably engageable with said outer face surfaces of said inner cheekpieces and said grooves of said inner and outer cheekpieces being opposed to each other receive a seat support rail therebetween; and d) fastening means extending through said apertures and said slot for attaching each of said outer cheekpieces to a respective one of said inner cheekpieces and for attaching each of said inner cheekpieces to a respective one of said lugs.

A further embodiment of the invention provides a clamp assembly for adjustably attaching a seat having seat support rails to a seat support post, said clamp assembly comprising:

a) a clamp support structure having a portion configured for attachment to a seat support post, said structure having a pair of spaced flat generally vertically extending surfaces and a lug extending generally perpendicular to the axis of said seat support post;

b) first and second inner cheekpieces each pivotally attached to said structure, said inner cheekpieces each having an inner face surface abutting and slideably engageable with one of said generally flat surfaces of said structure, an outer face surface angularly disposed with respect to said inner face surface, an aperture extending between said inner and outer face surfaces and a generally concave groove proximate an upper portion of said outer face surface;

c) first and second outer cheekpieces each having an outer face surface and an inner face surface, an aperture extending between said outer and inner face surfaces and a generally concave groove proximate an upper portion of said inner face surface, said inner face surfaces of said outer cheekpieces being slideably engageable with said outer face surfaces of said inner cheekpieces and said grooves of said inner and outer cheekpieces being opposed to each other receive and clamp a seat support rail therebetween;

d) first fastening means extending through said apertures for attaching each of said outer cheekpieces to a respective one of said inner cheekpieces and for attaching each of said inner cheekpieces to a respective one of said flat surfaces of said structure; and e) second fastening means for pivotally attaching said inner cheekpieces to said lug to adjust the angular position of said grooves with respect to said structure.

In a further embodiment, the invention provides a clamp assembly for adjustably attaching a seat having seat support rails to a seat support post, said clamp assembly comprising:

a) a clamp support structure having a portion configured for attachment to a seat support post, said structure including a transversely extending cradle having an arcuate crosssection and a pair of spaced lugs extending generally radially of said cradle;

b) a transversely extending cheekpiece support rotatably supported in said cradle, said cheekpiece support defining first and second inner cheekpieces on oppositely facing ends thereof, said inner cheekpieces each having an outer face surface angularly disposed with respect to the axis of said bearing, an aperture extending into said outer face surface and a generally concave groove proximate an upper portion of said outer face surface;

c) first and second outer cheekpieces each having an outer face surface and an inner face surface, a slot extending between said outer and inner face surfaces and a generally concave groove proximate an upper portion of said inner face surface, said inner face surfaces of said outer cheekpieces being slideably engageable with said outer face surfaces of said inner cheekpieces and said grooves of said inner and outer cheekpieces being opposed to each other receive and clamp a seat support rail therebetween;

d) first fastening means extending through said slots and apertures for attaching each of said outer cheekpieces to a respective one of said inner cheekpieces; and e) second fastening means for connecting said spaced lugs together to clamp said transverse cheekpiece support in said cradle.

The features and objects of the present invention will be more completely understood by the reading the detailed description which follows and in light of the drawings appended hereto.

BRIEF DESCRIPTION OF THE DRAWINGS

FIG. 1 is a left side elevation of a first embodiment of a seat clamp according to the present invention, FIG. 1a being a view of an outer cheekpiece seen in FIG. 1;

FIG. 2 is a rear elevation of the embodiment of FIG. 1;

FIG. 3 is a top plan view of the embodiment of FIG. 1;

FIG. 15 is a left side elevation of a fifth embodiment of the invention;

FIG. 16 is a rear elevation of the embodiment of FIG. 15;

FIG. 17 is a left side elevation of a sixth embodiment of the invention; and

FIG. 18 is a rear elevation of the embodiment of FIG. 17.

DETAILED DESCRIPTION OF THE INVENTION

Figure 4:
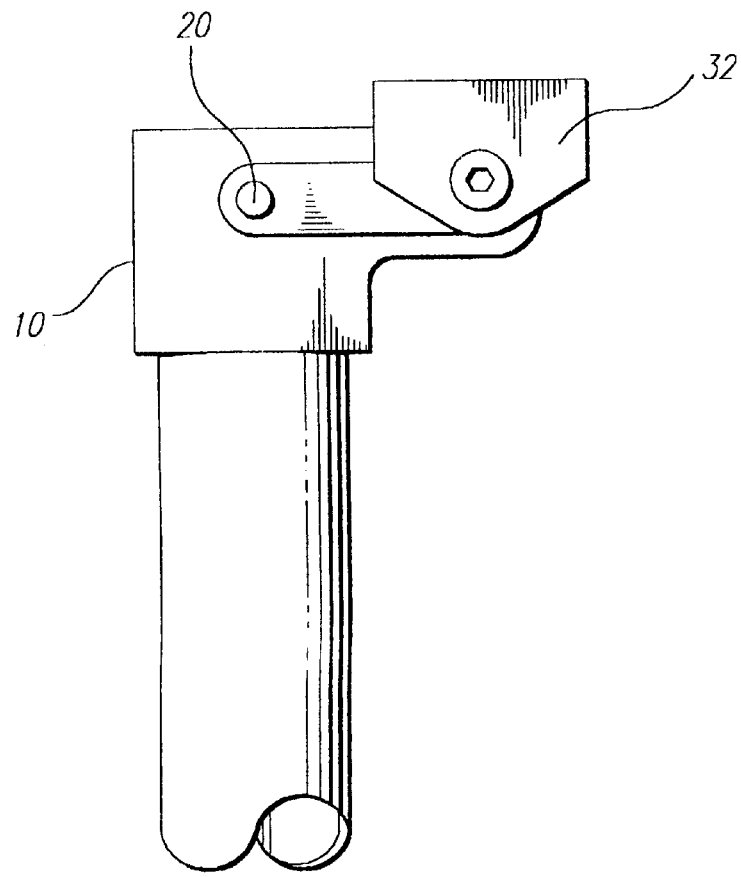
FIG. 4 is a left side elevation of a modification of the embodiment of FIG. 1.
Figure 5:
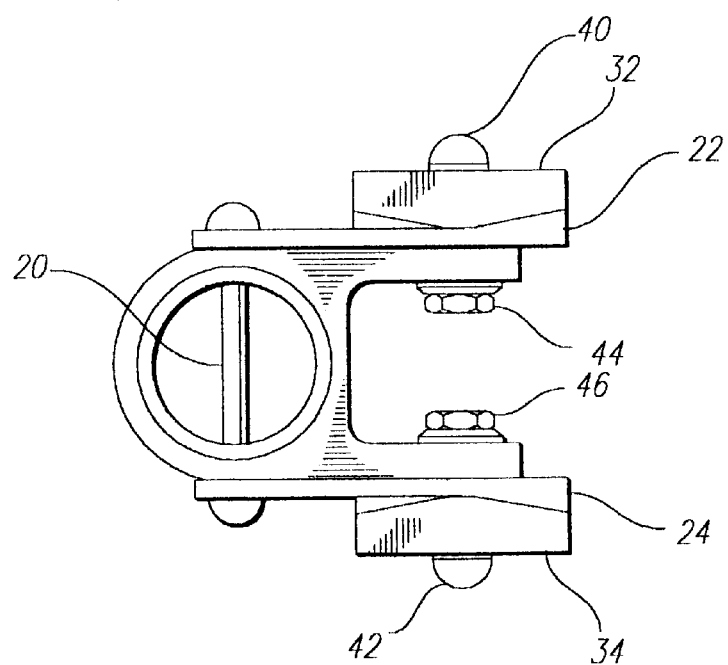
FIG. 5 is a bottom plan of the embodiment of FIG. 1.

Referring now to the drawings, it should be noted that like reference numerals are used to designate like parts throughout all figures and views.

In the embodiment and modifications shown in FIGS. 1–5, a cap-like or collar-like seat post attachment structure 10 fits over a seat post tube, not part of the invention. The structure 10 may be joined to the seat post tube by bonding, welding, press fit, mechanical fasteners or other acceptable means known to those skilled in the art.

Two lugs 12, 14 are formed integrally with the structure 10 and extend in a generally parallel fashion and in the same, preferably rearward direction to provide a rear offset of the structure 10 from the seat post. Forward and upward offsets can easily be provided if desired by appropriate positioning of the lugs 12, 14. An elongated preferably arcuate slot 16 is formed through each lug 12, 14 as shown. It is preferred but not necessary that the slots 16 be of greater length in the vertical direction and of shorter length in the horizontal direction. In this embodiment, it is preferred that the sides and ends of the slots 16 be closed, but it is not necessary to do so. A hole 18 is formed through diametrically opposite side walls of the structure 10 in the area adjacent the seat post tube to receive a pin 20 which serves the dual purpose of fastening the structure 10 to the seat post and of providing a pivot bearing at each end of the pin 20 for pivotally mounting a pair of generally parallel outer cheekpieces thereon which will be described below. The hole 18 is preferably round in shape, although other geometric shapes may be substituted without affecting the function of the invention.

One of a pair of inner cheekpieces 22, 24 respectively abuts a sidewall of each of the lugs 12, 14. It is preferred that the inner cheekpieces 22, 24 each have a flat surface that abuts the lug 12, 14 of the seat post attachment structure 10. A longitudinally extending groove 26, 28 is formed on the outer upper edges of the inner cheekpieces 22, 24, the grooves 26, 28 extending longitudinally for a length sufficient to provide adequate seat and rider support and to permit fore and aft positioning of seat rails in the grooves to the rider's satisfaction. A length of approximately 1.25 inches has proven satisfactory. It is also preferred that the radius of the grooves 26, 28 be slightly larger than the radius of the standard mounting rails of a bicycle type seat. It is further preferred that the outer, lower edge of the groove be slightly above the bottom of the groove and that the upper inner edge of the groove be slightly below the top of a circle formed by an imaginary continuation of the groove, leaving a groove that extends for 180 degrees or more.

Adjacent the outer, lower edge of the grooves 26, 28, each inner cheekpiece 22, 24 has a downwardly tapered outer sidewall 30. A hole extends through each inner cheekpiece 22, 24 from the tapered sidewall 30 to the vertical flat sidewall which abuts the respective lug 12 or 14 and in alignment with the slots 16 in the lugs. Each of the inner cheekpieces 22, 24 also has a forwardly extending ear which is pivotally mounted on pin 20 to permit angular positioning of the cheekpieces 22, 24 with respect to the seat post.

A pair of outer cheekpieces 32, 34 respectively abut the tapered surfaces 30 of the inner cheekpieces 22, 24. Extending generally horizontally along the upper portion of each of the second cheekpieces 32, 34 is a concave groove 36, 38 of shape complementary to the shape of grooves 26, 28 in the inner cheekpieces. The grooves 36, 38 extend upward and inward so as to form a nearly complete circular shape when the two complimentary cheekpieces 22, 32; 24, 34 abut each other. Each outer cheekpiece 32, 34 uniformly increases in thickness towards the lower distal end. An elongated slot 33 (FIG. 1a) extends in a generally vertical direction through each of the outer cheekpieces 32, 34 in alignment with the holes in the inner cheekpieces 22, 24 and the slots 16 in the lugs 12, 14. When the inner and outer cheekpieces are drawn together by tightening a pair of threaded fasteners 40, 42 which extend through the slots and holes in the cheekpieces and the slots 16 in the lugs, the seat rails may be longitudinally positioned and clamped in the grooves simultaneously with angular adjustment of the grooves, rails and seat as desired about the axis of pin 20. The fasteners 40, 42 preferably receive threaded locknuts 44, 46 on the threaded ends thereof.

It will be understood that the elongated slots 33 in the outer cheekpieces may be substituted for the holes in the inner cheekpieces and vice versa without affecting the functionality and/or the results of the invention. It is further understood that the cross-sectional shape of the grooves and the configuration of the angled walls of the cheekpieces may be varied without departing from the teachings of the invention. For example, the grooves 26, 36; 28, 38 defined by the cheekpieces can be essentially round as shown or they may be of hexagonal or other suitable generally concave configuration, and the angled walls of the cheekpieces which meet at surface 30 may be arcuate rather than planar.

As seen in FIG. 1, the outer cheekpieces 32, 34 are non-symmetrical in that the slots 33 therethrough are located closer to the end of the grooves 36, 38 at the rear edge of the cheekpieces than to the end of the grooves at the front edges. This permits one to attain a greater or lesser degree of offset (of the longitudinal center of the grooves from the centerline of the seat post) by simply replacing the right hand outer cheekpiece with the left hand one and vice versa. In comparison, the modification shown in FIGS. 4 and 5 uses symmetrical outer cheekpieces 32, 34.

Figure 8:
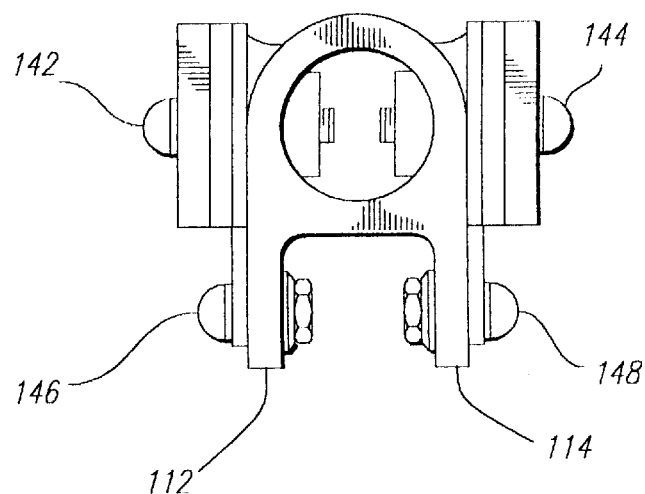
FIG. 8 is a top plan view of the embodiment of FIG. 6.
Figures 6, 7:
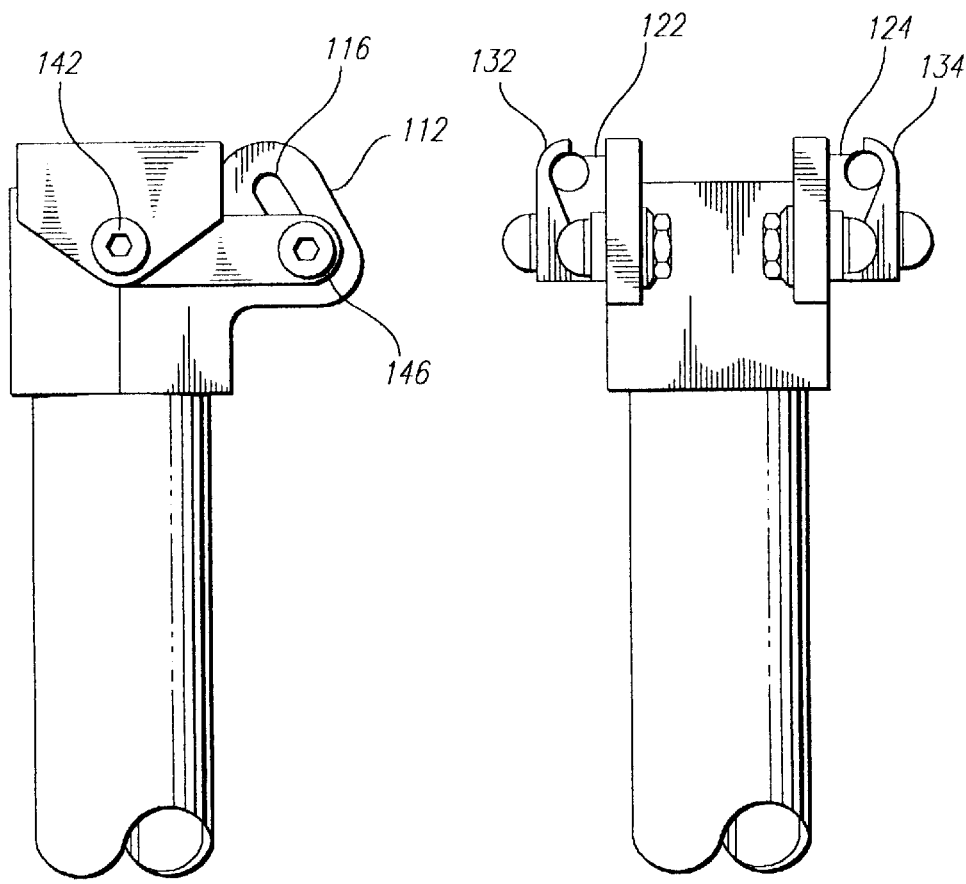
FIG. 6 is a left side elevation of a second embodiment of the invention.
FIG. 7 is a rear elevation of the embodiment of FIG. 6.

The second embodiment shown in FIGS. 6–8 is designed for angular adjustment of the grooves and seat but without any longitudinal offset of the center of the length of the grooves between the inner 122, 124 and outer 132, 134 cheekpieces from the axis of the seat tube. The pin 20 of the first embodiment is replaced with a pair of threaded fasteners 142, 144 which draw the inner and outer cheekpieces 122, 132; 124, 134 together. The lugs 112, 114 each with a slot 116, receive a second pair of threaded fasteners 146, 148 which permit tilting of the inner and outer cheekpieces about the axis of the threaded fasteners 142, 144 to provide for angular adjustment of the seat with respect to the clamp support structure 110.

Figure 11:
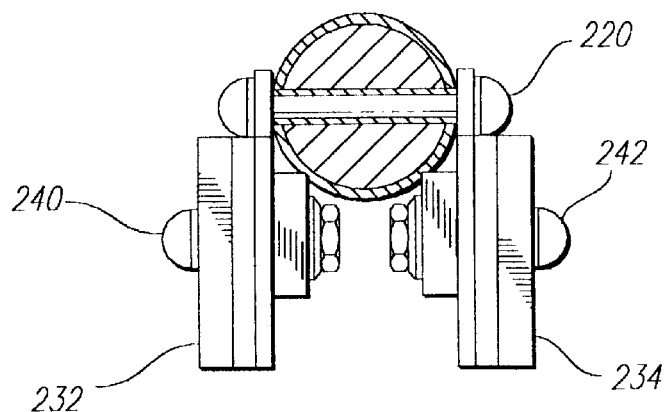
FIG. 11 is a top plan view of the embodiment of FIG. 9.
Figures 9, 10:
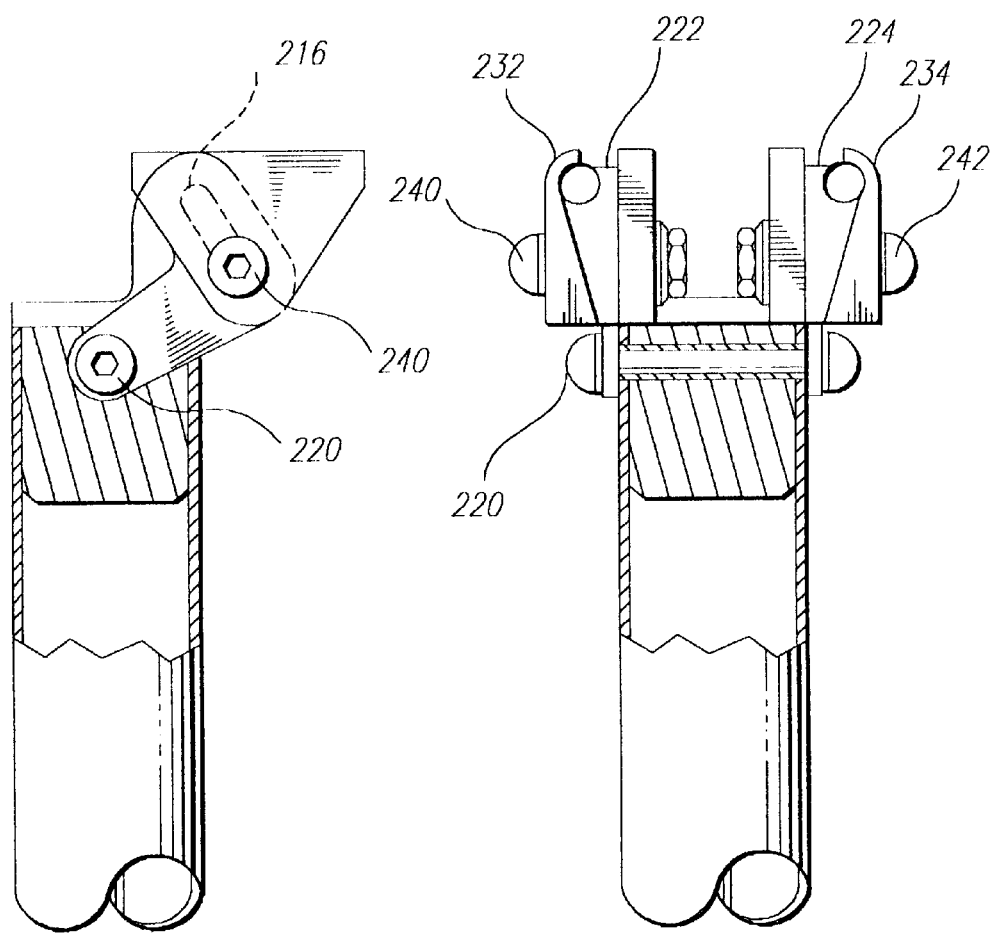
FIG. 9 is a left side elevation of a third embodiment of the invention.
FIG. 10 is a rear elevation of the embodiment of FIG. 9.

The third embodiment of FIGS. 9–11 is similar to the embodiment of FIGS. 1–3 but is configured to provide a greater amount of vertical offset in that the elevation of the tops of the inner and outer cheekpieces 222, 224; 232, 234 and seat rail receiving grooves defined thereby is higher than as shown in the embodiment of FIGS. 1–3.

Figure 12:
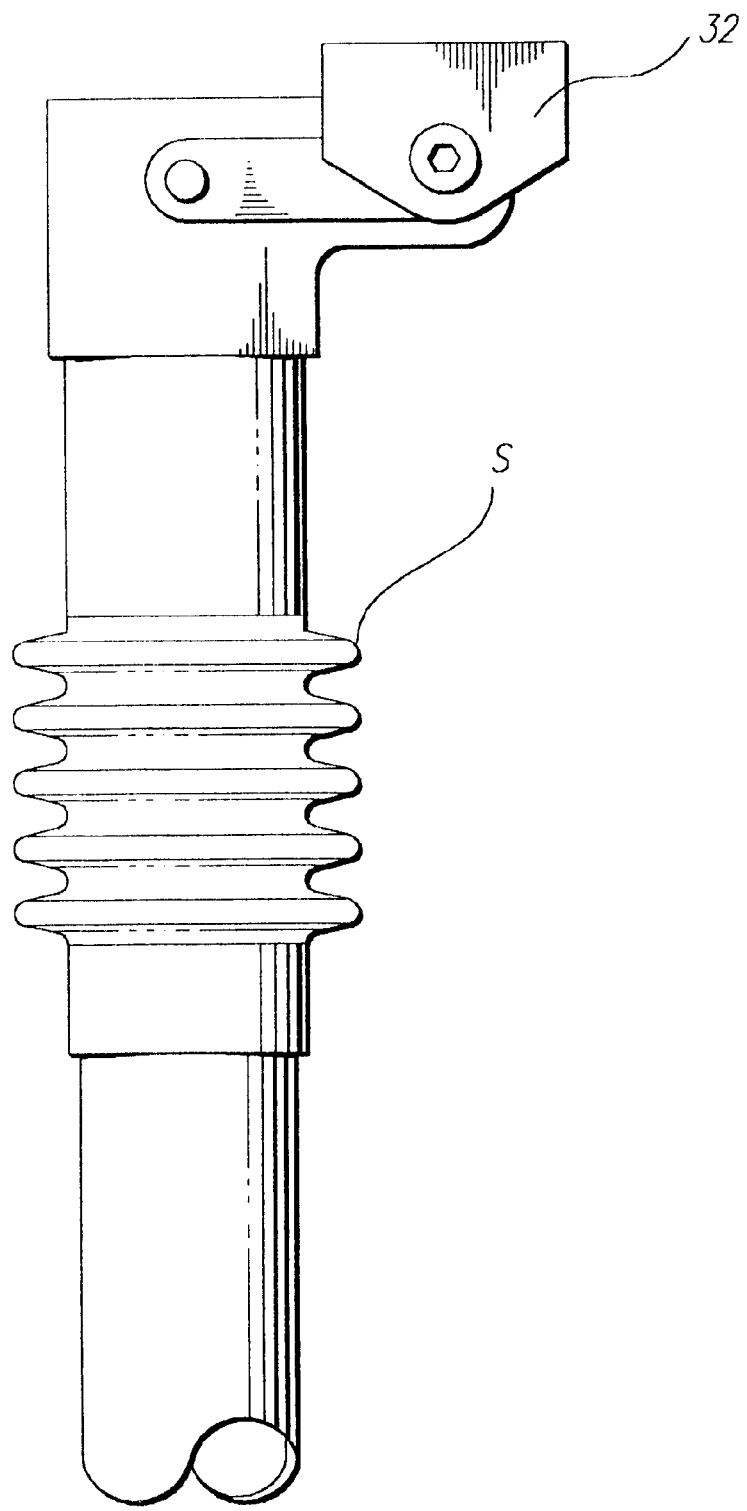
FIG. 12 is a left side elevation similar to the modification of FIG. 4 further including a shock absorber.

The modification of FIG. 12 is similar to the modification shown in FIG. 4 which uses symmetrical outer cheekpieces 32 but includes an attached seat tube with a built in shock absorber S below the clamp support structure 10. In its broadest aspects, the invention relates to the seat rail clamp assembly and its associated parts which may be sold separately as a package or as a unit permanently attached to a seat post with or without a shock absorber.

Figure 14:
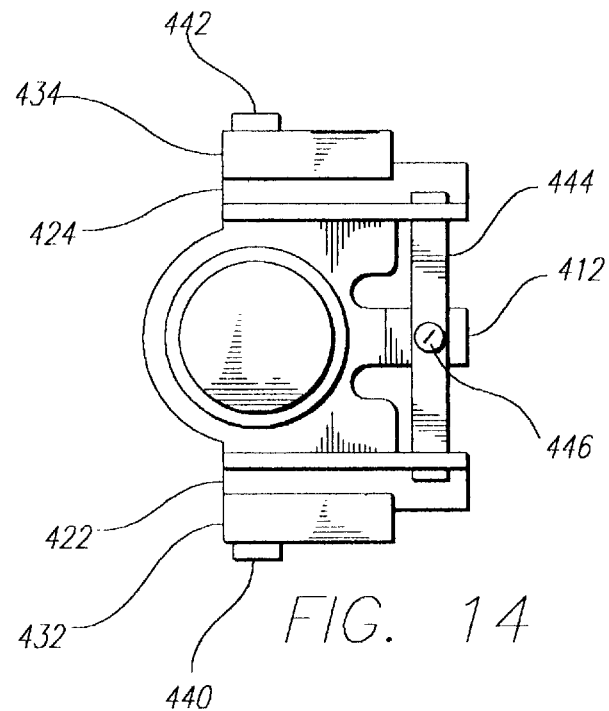
FIG. 14 is a top plan view of the embodiment of FIG. 13.
Figure 13:
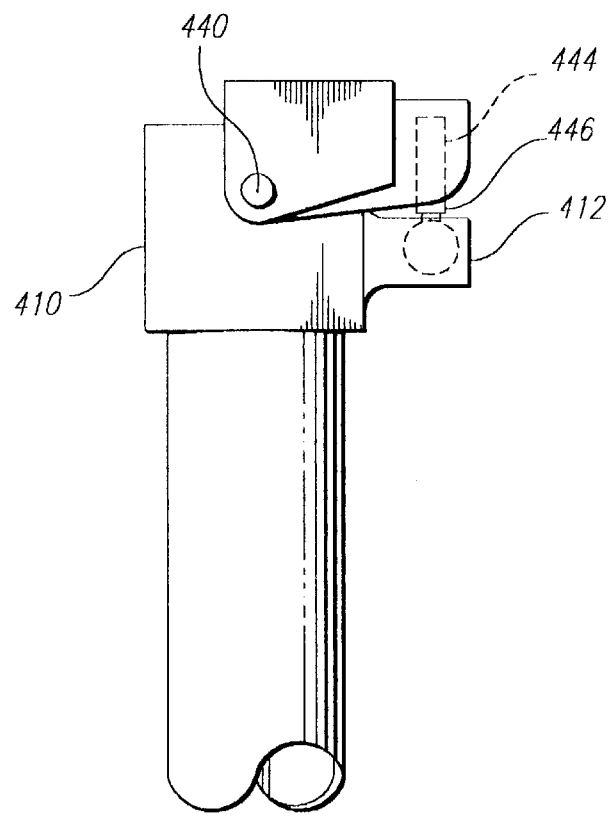
FIG. 13 is a left side elevation of a fourth embodiment of the invention.

The fourth embodiment of FIGS. 13 and 14 shows a structure 410 which includes a sleeve portion to be affixed over the top of a seat tube. The inner and outer opposed cheekpieces 422, 424; 432, 434 are drawn together to close grooves therebetween of the type previously described by tightening of threaded fasteners 440, 442 which are received in mating threaded holes in the structure 410. Angular adjustment of the inner and outer cheekpieces and grooves is achieved by the provision of rearwardly extending wing portions of the inner cheekpieces which are interconnected by a transverse brace 444 which in turn is adjustably connected to a rearwardly extending flange or lug 412 of structure 410 by a threaded connector 446 such as a set screw as shown. In this embodiment, the angular positioning of the grooves can be maintained without change during loosening of the outer cheekpieces 432, 434 for total replacement of a seat or fore and aft adjustment thereof.

The fifth embodiment of FIGS. 15 and 16 permits angular adjustment of the seat without loosening the seat rail grooves. This is accomplished by using a transversely extending cross shaft 550 having a cylindrical outer surface and inner cheekpiece configurations at its oppositely facing ends. An outer cheekpiece 532, 534 is fastened to each end of the cross shaft 550 by tightening screws 540, 542 to close and tighten seat rail receiving grooves between the inner and outer cheekpieces as previously described. The cross shaft 542 with attached outer cheekpieces 532, 542 is received in a cradle formed by an upwardly open arcuate surface 512 of structure 510 and a downwardly open arcuate surface 514 of a gate 516 pivotally attached to structure 510, the gate having a rearwardly extending lug or wing 518 attached by a threaded fastener 520 to a rearwardly extending lug or wing 522 integrally formed with structure 510. Angular adjustment of the grooves of the clamp assembly (and seat) is accomplished by loosening fastener 520 then rotating the cross shaft 550 and attached outer cheekpieces 532, 534 to the desired angle then re-tightening the fastener.

The sixth embodiment of FIGS. 17 and 18 is similar to the embodiment of FIGS. 15 and 16 but does not use a separate pivotally mounted gate. Instead the structure 610 includes a gate portion integrally formed therewith which is inherently springy enough to permit adjustment of the angle of rotation of the cross shaft 660 and attached outer cheekpieces 632, 634 when fastener 620 is loosened.

While the structures described fit over or around a seat post tube, it is understood by those skilled in the art that the structure may also be joined to the interior of the seat post tube.

What is claimed is:

1. A clamp assembly for adjustably attaching a seat having seat support rails to a seat support post, said clamp assembly comprising:

a) a clamp support structure having a portion configured for attachment to a seat support post, said structure having a pair of spaced generally parallel lugs thereon, said lugs each having a generally vertical flat surface and an elongated slot therein;

b) first and second inner cheekpieces each pivotally attached to said structure, said elongated slots in said lugs extending generally in the direction of an arc centered on the pivotal connection of said inner cheekpieces to said structure, said inner cheekpieces each having a generally vertical inner face surface abutting and slideably engageable with one of said generally vertical flat surfaces of said lugs, an outer face surface angularly disposed with respect to said inner face surface, an aperture extending between said inner and outer face surfaces and a generally concave groove proximate an upper portion of said outer face surface;

c) first and second outer cheekpieces each having an outer face surface and an inner face surface, an aperture extending between said outer and inner face surfaces and a generally concave groove proximate an upper portion of said inner face surface, said inner face surfaces of said outer cheekpieces being slideably engageable with said outer face surfaces of said inner cheekpieces and said grooves of said inner and outer cheekpieces being opposed to each other receive a seat support rail therebetween, said apertures in said outer cheekpieces being closer to one end of the grooves than to the other end of the grooves, whereby said outer cheekpieces are interchangeable to provide two different amounts of offset; and d) fastening means extending through said apertures and said slot for attaching each of said outer cheekpieces to a respective one of said inner cheekpieces and for attaching each of said inner cheekpieces to a respective one of said lugs.

2. The clamp assembly of claim 1, wherein said lugs extend in a generally horizontal direction.

3. The clamp assembly of claim 1, wherein said lugs extend in an upwardly inclined direction.

4. The clamp assembly of claim 1, wherein said abutting flat surfaces of said lugs and said inner face surfaces of said inner cheekpieces are generally vertical.

5. The clamp assembly of claim 1, further comprising a seat post affixed to said portion of said clamp support structure.

6. A clamp assembly for adjustably attaching a seat having seat support rails to a seat support post, said clamp assembly comprising:
   a) a clamp support structure having a portion configured for attachment to a seat support post, said structure having a pair of spaced generally parallel lugs thereon, said lugs each having a generally vertical flat surface and an elongated slot therein;
   b) first and second inner cheekpieces each pivotally attached to said structure, said elongated slots in said lugs extending generally in the direction of an arc centered on the pivotal connection of said inner cheekpieces to said structure, said inner cheekpieces each having a generally vertical inner face surface abutting and slideably engageable with one of said generally vertical flat surfaces of said lugs, a flat outer face surface angularly disposed with respect to said inner face surface, an aperture extending between said inner and outer face surfaces and a generally concave groove proximate an upper portion of said outer face surface;
   c) first and second outer cheekpieces each having an outer face surface and a flat inner face surface, an aperture extending between said outer and inner face surfaces and a generally concave groove proximate an upper portion of said inner face surface, said inner face surfaces of said outer cheekpieces being slideably engageable with said outer face surfaces of said inner cheekpieces and said grooves of said inner and outer cheekpieces being opposed to each other receive a seat support rail therebetween, said apertures through said inner and outer cheekpieces comprising an elongate slot in one cheekpiece and a bore in the other cheekpiece, said slots extending generally perpendicular to a line of intersection between the planes of said flat inner and outer faces of said inner cheekpieces; and
   d) fastening means extending through said apertures and said slot for attaching each of said outer cheekpieces to a respective one of said inner cheekpieces and for attaching each of said inner cheekpieces to a respective one of said lugs.

7. The clamp assembly of claim 6, wherein said line of intersection between the planes of said flat inner and outer faces of said inner cheekpieces is generally perpendicular to a plane containing an axis of a seat post when attached to said structure.

8. The clamp assembly of claim 6, wherein said bores are in said inner cheekpieces and said slots are in said outer cheekpieces.

9. The clamp assembly of claim 8, wherein said fastening means comprises a pair of threaded fasteners.

* * * * *